June 14, 1955        J. C. CHUPA        2,710,622
ONE PIECE FLUID VALVE
Filed April 26, 1951
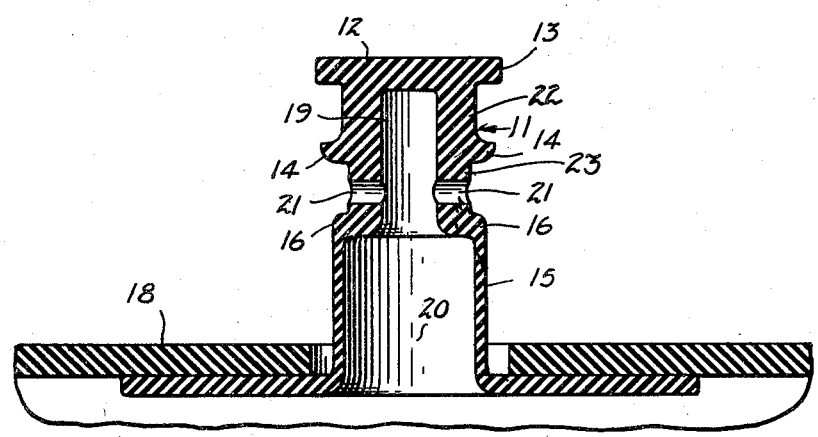
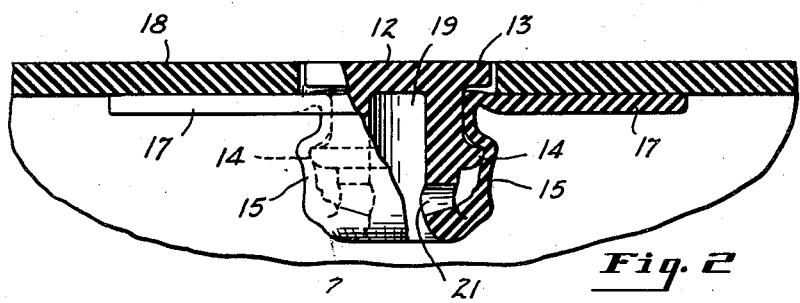
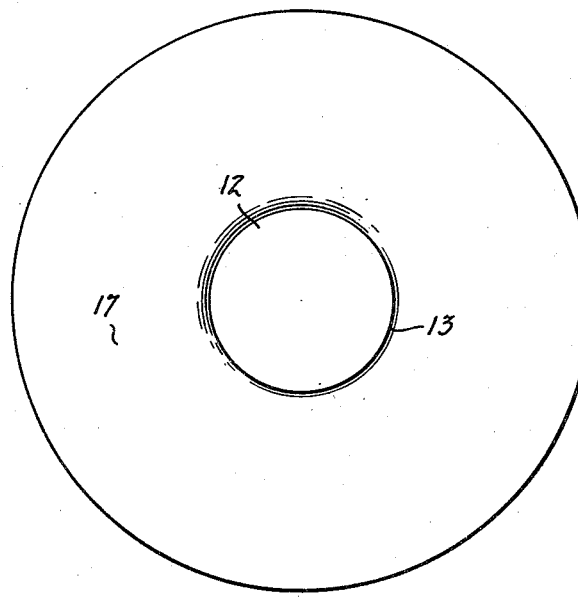
INVENTOR
John C. Chupa
BY
ATTORNEYS 2,710,622
ONE PIECE FLUID VALVE John C. Chupa, Sandusky, Ohio, assignor to The Barr Rubber Products Company, Sandusky, Ohio, a corporation of Ohio Application April 26, 1951, Serial No. 223,041

1 Claim. (Cl. 137—223)

This invention relates to a fluid valve made of elastic material and it is particularly adapted for use as an air valve in pneumatic balls, ball bladders and balloons.

The object of this invention is to provide an air valve which is inexpensive to produce, which is adapted to sit flush with the surface of an associated inflated ball or bladder, which covers a minimum area on the ball or bladder surface so that normal surface texture, toughness and "bounce" will be disturbed as little as possible which is of one piece construction and which provides an effective air seal that cannot be affected by the entry of dirt and foreign matter into the working interior of the valve when it is in its closed position.

The present invention is particularly novel and useful since it combines in a valve of simple construction all of the above desirable features. The valve is also aesthetically pleasing since in its closed position it presents a neat flat "buttonhead" rather than the ugly stuffed slots, nipples or patches typical of the valve art.

Prior valves, particularly those of one piece construction, have been objectionable because of the ease with which dirt and grit interfere with the proper operation of such valves. One of the particularly advantageous features of the present valve is that it provides a double seal in its closed position so that in use an inner seal is always protected from dirt and dust by an outer seal as will be more fully explained below.

In the drawings:

Figure 1 is a cross-section of a preferred embodiment of the valve in its open position.

Figure 2 is a partial cross-section of the same embodiment of valve in its closed position.

Figure 3 is a top view of the valve shown in Figures 1 and 2 but excluding the associated air retaining wall.

As may be seen in Figure 1, a relatively thick hollow cylinder 11 has its upper end closed by a wall or buttonhead 12. Formed peripherally around the cylinder 11 are the flanges 13 and 14. The foot of the cylinder 11 curves abruptly outwardly to join an integral thin walled hollow shank 15, the juncture of the cylinder 11 and the shank 15 forming a shoulder 16. The foot of the shank 15 flares radially outwardly to form a flange 17. The flange 17 may constitute an inegral portion of the wall of a ball, bladder, or balloon or it may be suitably attached or welded to such a wall. In Figures 1 and 2 an associated non-integral air retaining wall 18 is shown. The interior wall of the cylinder 11 defines a bore 19 which communicates with a bore 20 formed by the shank 15.

One or more radial passages 21 are formed in the cylinder 11 approximately midway between the peripheral flange 14 and the shoulder 16. These passages 21 communicate with the bore 19 so that in the position shown in Figure 1 air can pass freely into or out from the valve.

The closed position of the valve is shown in Figure 2. The cylinder 11 is pushed down into the shank 15 which is thereby turned inside out. Turning the shank 15 inside out in this manner causes the inside wall to become the outside wall and to become circumferentially stretched in the process. This circumferential stretching causes the shank 15 to tightly grip the peripheral flange 14 and to draw itself in toward inner portions 22 and 23 of the outer wall of the cylinder 11. Flow of air through the valve is thus cut off at two points; first, between the shank 15 and the cylinder portion 22 and second, between the shank 15 and the flange 14. These cooperating surfaces also act as dirt and dust shields so that while the valve is in its normal closed position any outside foreign matter is excluded from the interior of the valve by the barrier formed by the cylinder portion 22 and the shank 15.

As may be seen in the drawings, the wall 18 associated with the valve need have an opening formed therein only of slightly greater radius than that of the flange 13. The proportions of the valve may also be so chosen so that, as seen in Figure 2, the top of the valve is flush with the top surface of the wall 18 in the closed position.

In operation, the valve is closed simply by pressing inwardly on the buttonhead 12. The hollow shank 15 is thereby turned inside out and tightly engages the cylinder 11 and flange 14 to close off the passage of air. Fluid pressure from inside the retaining wall 18 acts to enhance this tight engagement. The force exerted by fluid pressure on the relatively small top end area of the bore 19 is insufficient to overcome the frictional resistance resulting from the tight engagement and the valve therefore remains securely closed. The valve is opened by simply grasping the buttonhead 12 and pulling outwardly.

The preferred embodiment of the valve illustrated above may be altered in a number of ways. The flange 13, for instance, is useful in limiting downward movement of the cylinder 11 when the valve is moved to the closed position, but this flange is not absolutely necessary to the proper operation of the valve. The flange 14 helps to provide an effective seal between the cylinder 11 and the shank 15 in the closed position and also helps to anchor the valve in its closed position, but a valve without this flange 14 will still function satisfactorily. Accordingly, the scope of the present invention is to be defined solely by the following claim.

What is claimed is:

A valve comprising a hollow elastic cylinder having one closed end, a coaxial elastic hollow cylindrical shank extending from the other end of said cylinder, the juncture of said cylinder and said shank forming a shoulder, said cylinder having a wall substantially thicker than the wall of said cylindrical shank whereby said cylinder is relatively rigid and said shank is relative flaccid, a radial passage extending through said wall of said cylinder, a first circumferential flange on the outside of said cylinder intermediate the ends thereof, and a second circumferential flange on the outside of said cylinder at said one closed end.

References Cited in the file of this patent
UNITED STATES PATENTS

| 1,942,959 | Fenton | Jan. 9, 1934 |

FOREIGN PATENTS

| 828,245 | France | 1938 |